United States Patent
Yamada et al.

(10) Patent No.: US 9,132,557 B2
(45) Date of Patent: Sep. 15, 2015

(54) LOAD-COMPENSATION DEVICE

(75) Inventors: Yasuyuki Yamada, Kanagawa (JP); Toshio Morita, Kanagawa (JP)

(73) Assignee: KEIO UNIVERSITY, Minato-ku, Tokyo (JP)

( * ) Notice: Subject to any disclaimer, the term of this patent is extended or adjusted under 35 U.S.C. 154(b) by 913 days.

(21) Appl. No.: 13/383,888

(22) PCT Filed: Jul. 14, 2010

(86) PCT No.: PCT/JP2010/061872
§ 371 (c)(1),
(2), (4) Date: Apr. 13, 2012

(87) PCT Pub. No.: WO2011/007793
PCT Pub. Date: Jan. 20, 2011

(65) Prior Publication Data
US 2012/0186380 A1 Jul. 26, 2012

(30) Foreign Application Priority Data

Jul. 15, 2009 (JP) .................................. 2009-166964
Jul. 16, 2009 (JP) .................................. 2009-167591

(51) Int. Cl.
*F15B 11/00* (2006.01)
*B25J 19/00* (2006.01)
*F15B 7/02* (2006.01)
*B66C 23/00* (2006.01)

(52) U.S. Cl.
CPC .......... *B25J 19/0012* (2013.01); *B25J 19/0016* (2013.01); *B66C 23/005* (2013.01); *F15B 7/02* (2013.01); *Y10T 74/20305* (2015.01)

(58) Field of Classification Search
CPC . B66C 23/005; B25J 19/0008; B25J 19/0012; B25J 19/0016; F15B 7/02; F15B 7/04
USPC .......................................................... 91/508
See application file for complete search history.

(56) References Cited

U.S. PATENT DOCUMENTS

| | | | | |
|---|---|---|---|---|
| 3,841,605 A | * | 10/1974 | Joraku et al. | 254/127 |
| 4,265,147 A | * | 5/1981 | Fox | 81/55 |
| 5,037,267 A | * | 8/1991 | Warner et al. | 414/744.6 |
| 2001/0014276 A1 | * | 8/2001 | Tranchida | 414/680 |

* cited by examiner

*Primary Examiner* — Michael Leslie
(74) *Attorney, Agent, or Firm* — Flynn, Thiel, Boutell & Tanis, P.C.

(57) ABSTRACT

A load compensation device which can compensate loads on a working arm has a working arm supported by a first pivot-mounting part on a supporting body, an actuator cylinder supported by a second pivot-mounting part above the first pivot mounting part, and a piston rod of the actuator cylinder linked to a third pivot-mounting part of the working arm. A piston rod of a compensation cylinder is linked to a movable frame, and a piston of the compensation cylinder is urged upward by means of a compression coil spring which pushes the movable frame upward. The actuator cylinder and the compensation cylinder are linked by the inside of a conduit, and when the working arm is pivoted, the displacement of the piston of the actuator cylinder urges the piston of the compensation cylinder, a torque which balances the load torque of a load W on the working arm is generated.

4 Claims, 17 Drawing Sheets

LOAD-COMPENSATION DEVICE

TECHNICAL FIELD

The present invention relates to a load compensation device for balancing a weight force acting on a working arm as a whole, in a robot provided with such a working arm, a manipulator or a working machine.

PRIOR ART

Conventional examples of load compensation devices such as a robot provided with a working arm which pivots within a vertical plane include a device in which a weight force acting on a working arm and a workpiece or the like held thereby is balanced with a spring force using a wire and a coil spring linked thereto, regardless of the angle of inclination of the working arm, as disclosed in Patent Documents 1 and 2.

FIG. 16 is a schematic diagram of the structure of this kind of conventional load compensation device; a load compensation device A1 has a working arm A3 which is supported by a supporting body A2 placed on a horizontal floor surface, in such a way as to be able to pivot about a horizontal shaft at a point O, and one end of a wire A4 is linked to a point a which is a distance h vertically above the point O.

The wire A4 bends by way of a pair of guide pulleys A5, A6 which are provided at a point b on the working arm A3 which is a distance p away from the point O in such a way as to pinch the wire A4 therebetween from above and below, while the other end of said wire A4 is linked to one end of a tension coil spring A7.

The other end of the tension coil spring A7 is linked to the working arm A3, in a state in which said tension coil spring A7 is stretched from its natural length (the length when no external force is acting thereon) by an amount which is equivalent to the length $L_s$ of the wire A4 between the points a and b. (It should be noted that in FIG. 16, the tension coil spring A7 is depicted shorter than its actual length compared with the length $L_s$ in order to simplify the illustration.)

Here, the working arm A3 is holding a workpiece which is not depicted, and a load W equivalent to the total weight of the workpiece and the weight of the working arm A3 itself acts vertically at a point of application G.

If the distance O-G is L, then when the working arm A3 is at an attitude which is inclined by an angle θ from the horizontal X, as shown in FIG. 16, the load torque $\tau_w$ about the point O which is produced by the load W is as follows:

$$\tau_w = WL \cos\theta \tag{e1}$$

Meanwhile, if the spring constant of the tension coil spring A7 is k, then the tension T acting on the wire A4 due to the tension coil spring A7 which is stretched by the length $L_s$ from the natural length thereof is: $T=kL_s$ so, as can be seen in FIG. 16, the spring force torque $\tau_s$ produced at the point O by the tension T is as follows:

$$\tau_s = kL_{sh} \sin\phi \tag{e2}$$

and $$L_s \sin\phi = p \cos\theta \tag{e3}$$

so if φ is eliminated from the above equations (e2) and (e3), $$\tau_s = kph \cos\theta \tag{e4}$$

Here, the spring force torque $\tau_s$ has the opposite orientation to the load torque $\tau_w$ and if the spring constant k of the tension coil spring A7 is selected in such a way that k=WL/ph from the relationship of equations (e1) and (e4), the spring force torque $\tau_s$ balances the load torque $\tau_w$ regardless of the angle θ, and the load can be compensated.

PRIOR ART DOCUMENTS

Patent Documents

Patent Document 1: Japanese Patent 4144021
Patent Document 2: Japanese Unexamined Patent Application Publication 2007-119249

SUMMARY OF THE INVENTION

Problem to be Resolved by the Invention

However, with the load compensation device A1 described above, when the working arm A3 pivots up or down and the wire A4 supporting the working arm A3 passes between the pair of guide pulleys A5, A6 and bending is repeated over a long period of time, there is a risk of the wire breaking due to fatigue, which may lead to an accident in which the working arm A3 falls.

Furthermore, if the diameter of the wire A4 supporting the working arm A3 is increased, or the diameter of the guide pulleys A5, A6 for bending and guiding the wire A4 is increased, this produces a deviation in the geometric relationships of the various elements forming a device such as that described above for compensating load, and it is no longer possible to fully compensate loads, so such a device cannot readily be applied to a working arm on which large loads act.

The aim of the present invention lies in resolving the abovementioned problem of the conventional technology by providing a load compensation device which can compensate loads on a working arm on which large loads act, while also having excellent safety and durability.

Means of Resolving the Problem

The load compensation device according to the present invention comprises: a supporting body; a working arm whereof one end is pivotably supported on the supporting body by a first pivot-mounting part; an actuator cylinder which is pivotably supported by a second pivot-mounting part at a fixed position on the supporting body vertically above the first pivot-mounting part; a piston rod which has a piston inserted into the actuator cylinder and is pivotably linked by a third pivot-mounting part at a position part way along the working arm in the lengthwise direction thereof; a compensation cylinder which is provided separately from the working arm and is linked to the actuator cylinder by a conduit, and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston.

The load compensation device according to the present invention comprises: a supporting body; a working arm whereof one end is pivotably supported on the supporting body by a first pivot-mounting part; an actuator cylinder which is pivotably linked by a third pivot-mounting part at a position part way along the working arm in the lengthwise direction thereof; a piston rod which is pivotably supported by a second pivot-mounting part at a fixed position on the supporting body vertically above the first pivot-mounting part; a compensation cylinder which is provided separately from the working arm and is linked to the actuator cylinder by a conduit, and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston.

The load compensation device according to the present invention comprises: a supporting body; a working arm whereof one end is pivotably supported on the supporting body by a first pivot-mounting part; an actuator cylinder which is pivotably supported by a second pivot-mounting part at a fixed position on the supporting body vertically above the first pivot-mounting part; a piston rod which has a piston inserted into the actuator cylinder and is pivotably linked by a third pivot-mounting part at a position part way along the working arm in the lengthwise direction thereof; a compensation cylinder which is provided separately from the working arm and is linked to the actuator cylinder by a conduit, and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston; and a port of the actuator cylinder and/or the compensation cylinder on the opposite side to the side where they are linked by the conduit is linked to a driving fluid circuit by way of a driving conduit, and working fluid inside the cylinder chamber which communicates with said port is supplied and discharged from the driving fluid circuit, whereby the working arm is driven.

The load compensation device according to the present invention comprises: a supporting body; a working arm whereof one end is pivotably supported on the supporting body by a first pivot-mounting part; an actuator cylinder which is pivotably linked by a third pivot-mounting part at a position part way along the working arm in the lengthwise direction thereof; a piston rod which is pivotably supported by a second pivot-mounting part at a fixed position on the supporting body vertically above the first pivot-mounting part; a compensation cylinder which is provided separately from the working arm and is linked to the actuator cylinder by a conduit, and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston; and a port of the actuator cylinder and/or the compensation cylinder on the opposite side to the side where they are linked by the conduit is linked to a driving fluid circuit by way of a driving conduit, and working fluid inside the cylinder chamber which communicates with said port is supplied and discharged from the driving fluid circuit, whereby the working arm is driven.

The load compensation device according to the present invention comprises: a supporting body; a working arm whereof one end is pivotably supported on the supporting body by a first pivot-mounting part; a slider which is pivotably supported by a second pivot-mounting part at a fixed position on the supporting body vertically above the first pivot-mounting part; a guide rod which is held and guided by the slider in such a way as to be able to slide axially through the second pivot-mounting part, whereof one end which projects from the slider is pivotably linked by a third pivot-mounting part at a position part way along the working arm in the lengthwise direction thereof, and the other end which projects from the slider is provided with a spring-receiving part; and a compression coil spring for compensating the load torque applied to the working arm about the first pivot-mounting part, which is extendibly fitted with clearance around the outer periphery of the guide rod and is inserted between the spring-receiving part and the slider in a state in which the overall length is compressed from the natural unloaded length thereof by a length substantially equal to the distance between the second pivot-mounting part and the third pivot-mounting part.

Furthermore, the load compensation device according to the present invention comprises: a supporting body; a working arm whereof one end is pivotably supported on the supporting body by a first pivot-mounting part; a slider which is pivotably supported by a third pivot-mounting part at a position part way along the working arm in the lengthwise direction thereof; a guide rod which is held and guided by the slider in such a way as to be able to slide axially through the third pivot-mounting part, whereof one end which projects from the slider is pivotably linked by a second pivot-mounting part to a fixed position which is separate from and vertically above the first pivot-mounting part, and the other end which projects from the slider is provided with a spring-receiving part; and a compression coil spring for compensating the load torque applied to the working arm about the first pivot-mounting part, which is extendibly fitted with clearance around the outer periphery of the guide rod and is inserted between the spring-receiving part and the slider in a state in which the overall length is compressed from the natural unloaded length thereof by a length substantially equal to the distance between the second pivot-mounting part and the third pivot-mounting part.

Advantage of the Invention

The load compensation device according to the present invention has a structure whereby a load acting on a working arm is received by an actuator cylinder, and that load is transmitted to a spring member by way of a compensation cylinder which is linked to the actuator cylinder by a conduit, so there is no risk of an accident in which the working arm falls due to breakage caused by wear or fatigue of a wire, as in conventional load compensation devices employing a wire and a tension coil spring, it is possible to handle large loads, and a high level of safety and durability can be achieved.

The actuator cylinder and the compensation cylinder are linked by a conduit, so there is a large degree of freedom in the places where the compensation cylinder and spring member are positioned. Furthermore, by varying the pressure-receiving surface area ratio of the actuator cylinder and compensation cylinder, it is possible to select the tensile force produced by the piston rod of the actuator cylinder and the apparent spring constant during extension/contraction displacement in a range which is the square of the pressure-receiving surface area ratio, so there is a large degree of design freedom for the load compensation device and a broad range of weights can be handled.

In the load compensation device according to the present invention, it is possible to adopt a layout in which the actuator cylinder and the piston rod thereof are oriented in opposite directions, and the piston rod side is linked to the second pivot-mounting part and the actuator cylinder is linked to the third pivot-mounting part; if necessary, it is possible to select either of the two systems, so there is a large degree of design freedom.

With the load compensation device according to the present invention, the actuator cylinder or compensation cylinder used for compensating a load on the working arm may also be used as a drive mechanism for driving the working arm, so there is no need to provide a separate drive cylinder device etc., and the device can be made more compact and lightweight, while maintenance is simplified and production costs can be reduced.

With the load compensation device according to the present invention, a load which acts on the working arm is received by a compression coil spring by way of a guide rod, so there is no risk of an accident in which the working arm falls due to breakage caused by wear or fatigue of a wire, as in conventional load compensation devices employing a wire and a tension coil spring, and a high level of safety and durability can be achieved.

A load which acts on the working arm is received by the combined guide rod and compression coil spring, so heavier objects can be handled, compared with a conventional load compensation device employing a wire.

The load compensation device according to the present invention offers a high degree of freedom in the position where the compression coil spring is mounted, which may be anywhere on the working arm, so there is a high degree of design freedom.

With the load compensation device according to the present invention, the load torque received by a linking support body is not applied to the working arm, so the load on the working arm supported by the supporting body can still be compensated if a further second stage object such as a working arm or an end effector is linked to the linking support body, regardless of any change in the center of gravity position of the object which is linked in front of the linking support body.

MODE OF EMBODIMENT OF THE INVENTION

The present invention will be described below with reference to the exemplary embodiments shown in the figures.

Exemplary Embodiment 1

Figure 1:
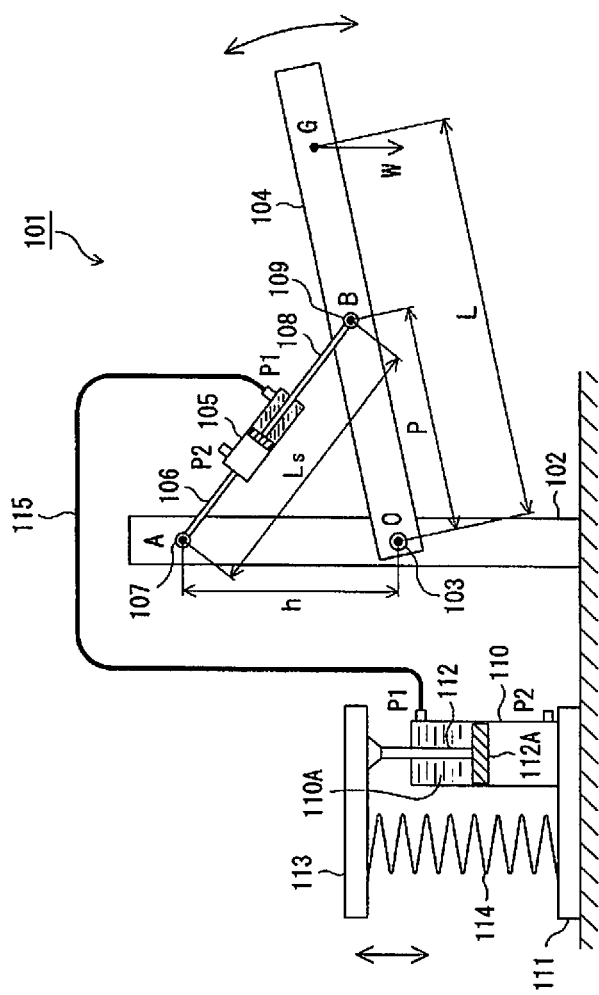
FIG. 1 is a schematic diagram of Exemplary Embodiment 1 of the load compensation device employing an actuator cylinder according to the present invention.

FIG. 1 is a schematic diagram of Exemplary Embodiment 1 of the load compensation device according to the present invention; in this figure, a load compensation device 101 comprises a supporting body 102 which is secured to a floor surface. A working arm 104 is supported on the supporting body 102 by means of a horizontal shaft 103 (first pivot-mounting part) in such a way as to be able to pivot about said shaft 103.

Furthermore, at a point A which is a position lying a distance h vertically above the center O of the shaft 103 of the supporting body 102, an actuator cylinder 105 is pivotably supported by a shaft 107 (second pivot-mounting part) parallel to the shaft 103, with the interposition of a linking rod 106 which is fixed to the head side of the actuator cylinder 105.

Figure 2:
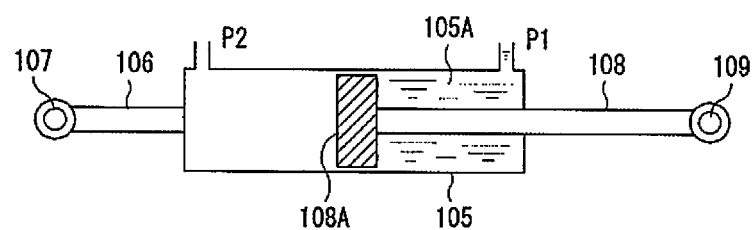
FIG. 2 is a view in longitudinal section of the actuator cylinder.

As shown in FIG. 2, a piston 108A provided at one end of a piston rod 108 is slidably inserted inside a cylinder chamber 105A of the actuator cylinder 105. Furthermore, ports P1 and P2 for providing communication between the interior of the cylinder chamber 105A and the outside are provided in the peripheral wall at the ends of the cylinder chamber 105A on the rod side and the head side.

As shown in FIG. 1, the end of the piston rod 108 projecting from the cylinder chamber 105A is linked by a shaft 109 (third pivot-mounting part) parallel to the shaft 103, at a point B part way along the working arm 104 in the lengthwise direction thereof, which is a distance p away from the point O which is the center of the shaft 103 (first pivot-mounting part).

A compensation cylinder 110 is disposed on a fixed frame 111 in proximity to the supporting body 102. A piston 112A is provided inside the compensation cylinder 110 and a piston rod 112 projects toward the top of the cylinder.

The upper end of the piston rod 112 is linked to the lower surface of a movable frame 113. The movable frame 113 is held on the fixed frame 111 with the interposition of a guide means, which is not depicted, in such a way as to be able to displace up and down as a single piece with the piston rod 112. Furthermore, a compression coil spring 114 (spring member) is incorporated with the compensation cylinder 110 between the fixed frame 111 and the movable frame 113, in a state in which said spring is compressed by a prescribed length from the natural length thereof.

The compensation cylinder 110 has two ports P1, P2 for providing communication between the rod-side end and head-side end of the cylinder chamber 110A and the outside, in the same way as in the abovementioned actuator cylinder 105, and the port P1 on the side of the compensation cylinder 110 which is filled with working fluid and the port P1 on the actuator cylinder 105 side are linked by a conduit 115.

The rod side of the cylinder chamber 105A of the actuator cylinder 105, the rod side of the cylinder chamber 110A of the compensation cylinder 110, and the inside of the conduit 115 are filled with working fluid. The working fluid which is used is generally an incompressible fluid such as oil.

Furthermore, the ports P2 provided in the actuator cylinder 105 and the compensation cylinder 110 are both open to the atmosphere.

When the working arm 104 is rotated about the shaft 103 in this load compensation device 101, the piston rod 108 causes the piston 108A inside the cylinder 105 to move, and this movement is transmitted to the piston 112A of the compensation cylinder 110 by way of the working fluid.

In this instance, if the piston 108A of the actuator cylinder 105 moves inside the cylinder by $L_1$, the piston 112A on the compensation cylinder 110 side moves by $L_2$ in response. If the pressure-receiving surface area of the piston 108A of the actuator cylinder 105 is $S_1$ and the pressure-receiving surface area of the piston 112A of the compensation cylinder 110 is $S_2$, and the working fluid is an incompressible fluid, the volume of working fluid flowing out (or flowing in) on the actuator cylinder 105 side is equal to the volume of fluid flowing out (or flowing in) on the compensation cylinder side, so:

$$L_1 S_1 = L_2 S_2 \quad (1)$$

If the spring constant of the compression coil spring 114 is K, then the force F which acts on the piston 112A of the compensation cylinder 110 when said spring is compressed by $L_2$ from its natural length is represented by:

$$F = K L_2 \quad (2)$$

If the force transmitted from the compensation cylinder 110 to the piston 108A of the actuator cylinder 105 by way of the working fluid is f, then according to Pascal's law:

$$f = (S_1/S_2) F \quad (3)$$

If equations (1) and (2) are applied to equation (3), the following is obtained:

$$f = (S_1/S_2) K L_2 = (S_1/S_2)^2 K L_1 \quad (4)$$

Here, if $k = (S_1/S_2)^2 K$, then $f = k L_1$, so the actuator cylinder 105 is considered to be equivalent to a spring having the spring constant k, in terms of apparent value.

In the case considered here, the working arm 104 is holding a workpiece or the like which is not depicted, and a load W which is equivalent to the total weight of the workpiece and the weight of the working arm 104 itself is acting vertically at the point of application G which is a distance L away from the point O.

Figure 16:
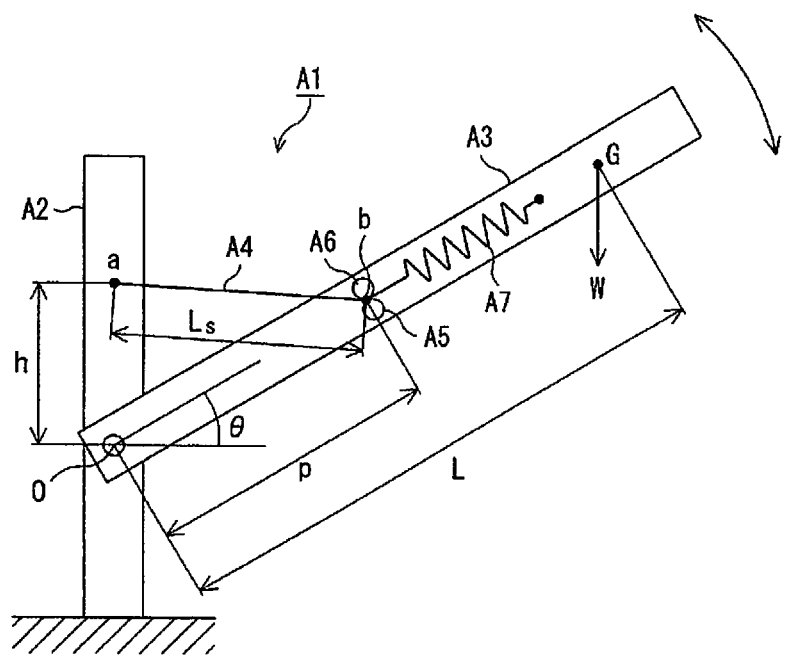
FIG. 16 is a schematic diagram of a conventional load compensation device.
Figure 17:
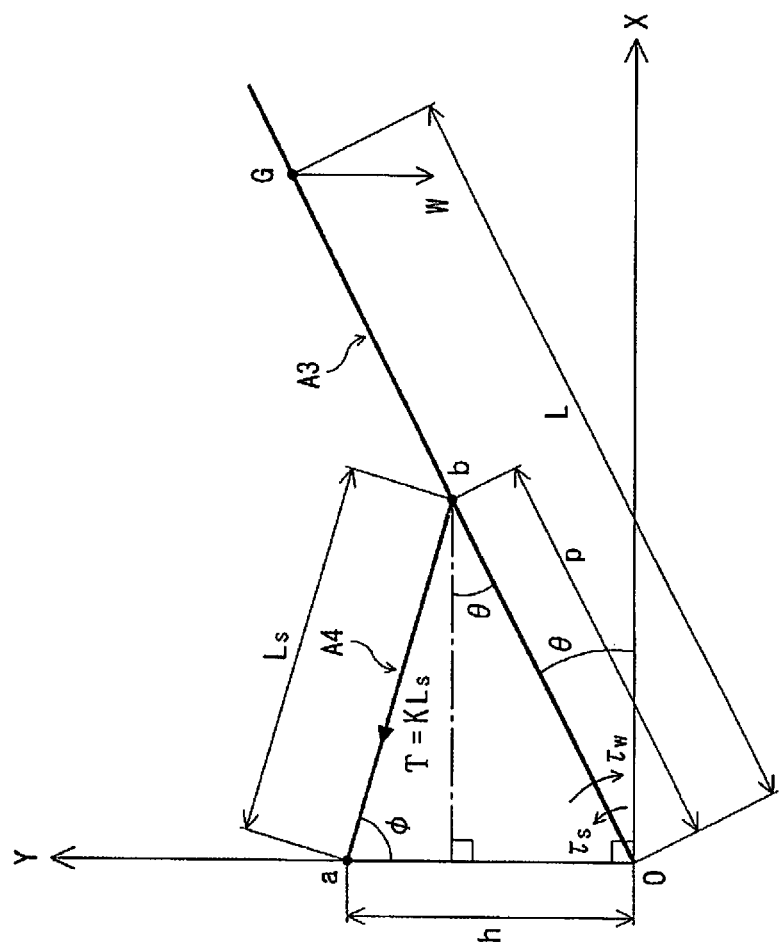
FIG. 17 is a schematic diagram showing the geometric relationship of the various elements of a conventional load compensation device.

If $k = WL/ph$, and $L_1$ is the distance $L_s$ between the point A in the center position of the shaft 107 (second pivot-mounting part) and the point B in the center position of the shaft 109 (third pivot-mounting part), then under the same principles as the compensation principles in the conventional load compensation device described above in relation to FIGS. 16 and 17, load compensation can be achieved such that the load torque acting about the shaft 103 (first pivot-mounting part) which acts on the working arm 104 is zero, regardless of the angle of inclination of the working arm 104. In this case, the spring constant K of the compression coil spring 114 is as follows.

$$K = (S_2/S_1)^2 k = (S_2/S_1)^2 (WL/ph) \quad (5)$$

As is clear from equation (5), the spring constant K of the compression coil spring 114 can be varied by the square of the pressure-receiving surface ratio of the piston 112A of the compensation cylinder 110 and the piston 108A of the actuator cylinder 105, so the degree of design freedom can be increased even if the selection range of p, h etc. is not very broad.

It should be noted that in the load compensation device 101 according to this exemplary embodiment, the compensation cylinder 110 and the compression coil spring 114 are placed in a parallel arrangement on the fixed frame 111, and the piston rod 112 of the compensation cylinder 110 and the compression coil spring 114 are linked by way of the movable frame 113, but this is not limiting, and the piston rod 112 and the compression coil spring 114 may be placed coaxially in series, or the compression coil spring 114 may be internally housed on the head side of the compensation cylinder 110 in order to urge the piston directly, for example.

Furthermore, the compression coil spring 114 is used in the load compensation device 101 according to this exemplary embodiment, but the spring member is not limited to this form, and it is possible to achieve an equivalent urging force to the compression coil spring 114 by linking the piston rod 112 to a tension coil spring, for example.

Moreover, a function for locking the working arm 104 or adjusting the impedance can be easily added by including an open/close valve or accumulator or the like part way along the conduit 115 which links the actuator cylinder 105 and the compensation cylinder 110.

Exemplary Embodiment 2

Figure 3:
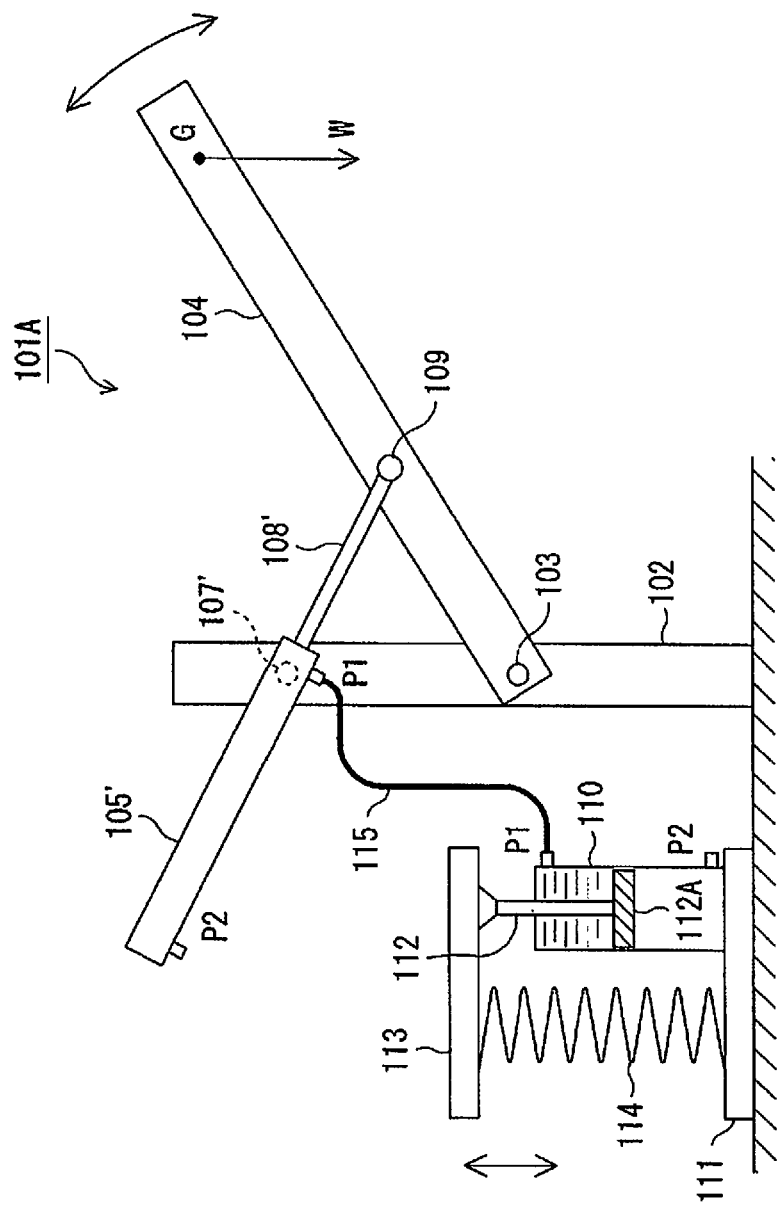
FIG. 3 is a schematic diagram of Exemplary Embodiment 2 of the load compensation device according to the present invention.

FIG. 3 is a schematic diagram of Exemplary Embodiment 2 of the load compensation device according to the present invention; in the load compensation device 101A shown in this figure, the outer peripheral surface at the end of an actuator cylinder 105' on the piston rod 108' side is pivotably supported on the supporting body 102 by a shaft 107' (second pivot-mounting part), and elements in this figure having the same number as in FIG. 1 constitute substantially the same elements as in the load compensation device 101 described above.

The load compensation device 101A shown in FIG. 3 operates under the same load compensation principle as the load compensation device 101 described above, but the end position of the actuator cylinder 105' on the rod side is rotatably supported on the supporting body 102 by the shaft 107', and as a result it is possible to lengthen the stroke of the piston rod 108', which has the advantage of increasing the range of pivoting of the working arm 104.

Exemplary Embodiment 3

Figure 4:
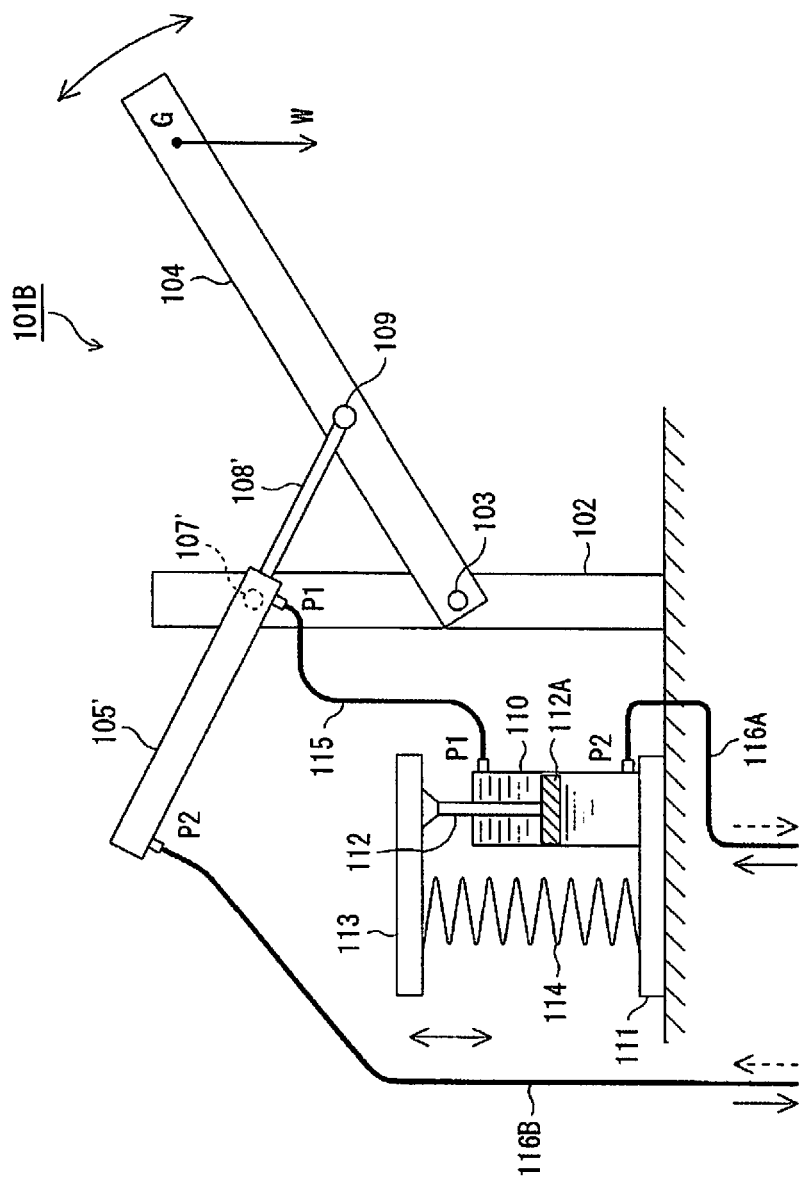
FIG. 4 is a schematic diagram of Exemplary Embodiment 3 of the load compensation device according to the present invention.

In the load compensation device 101B shown in FIG. 4, driving working fluid is supplied to the port P2 on the head side of the compensation cylinder 110 and the port P2 on the head side of the actuator cylinder 105' in the load compensation device 101A described above, or a pair of driving conduits 116A, 116B for discharge are further added; the other elements have substantially the same configuration as in the load compensation device 101A shown in FIG. 3.

In the load compensation device 101B, the driving conduits 116A, 116B are connected to a driving fluid circuit which is not depicted. A known hydraulic circuit or the like comprising a hydraulic pump and a directional switching valve etc. is used as the driving fluid circuit, for example.

In the device in this exemplary embodiment, the piston 112A of the compensation cylinder 110 is pushed down when working fluid is supplied from one of the driving conduits 116A to the compensation cylinder 110 while the load torque acting on the working arm 104 about the shaft 103 (first pivot-mounting part) is being compensated by means of the repellent force of the compression coil spring 114 (spring member).

As a result, the fluid on the rod side of the cylinder chamber 110A is pushed out from the port P1, passes through the conduit 115, and flows into the actuator cylinder 105' from the port P1 in the cylinder 105'; the fact that the piston is pushed up means that the working arm 104 is pivoted counterclockwise by means of the rod 108', whereby the working arm 104 is raised.

The cylinder chamber on the head side of the actuator cylinder 105' of the load compensation device 101B is also filled with working fluid which is returned to the driving fluid circuit side via the driving conduit 116B by the movement of the piston.

On the other hand, when working fluid is supplied to the actuator cylinder 105' via the driving fluid conduit 116B, the working arm 104 pivots clockwise and is lowered, and the fluid inside the cylinder chamber on the rod side of the actuator cylinder 105' passes from the port P1 through the conduit 115 and flows from the port P1 in the compensation cylinder 110 to the rod side of the cylinder chamber 110A.

As a result, the piston 112A of the compensation cylinder 110 is pushed downward, the piston rod 112 and movable frame 113 are lowered as a single piece, and the compression coil spring 114 is further compressed whereby the repellent force increases, and this increased repellent force compensates the load torque which has been increased by clockwise pivoting of the working arm 104.

In this exemplary embodiment, the actuator cylinder 105' and the compensation cylinder 110 which are used to compensate the load of the working arm 104 also serve as the drive mechanism for the working arm 104 so there is no need to provide a separate drive cylinder device or the like.

Moreover, the driving conduits 116A, 116B in the load compensation device 101B according to this exemplary embodiment are both connected to a driving fluid circuit which is not depicted, but one of these driving conduits may be omitted. In that case, the port P2 of the actuator cylinder 105' or the compensation cylinder 110 to which a conduit is not connected is open to the atmosphere.

When fluid is then supplied from the driving fluid circuit, or suctioned if a negative pressure is set, by way of the driving fluid conduit which is connected to the port P2 of the compensation cylinder 110 or actuator cylinder 105', the working arm 104 can be turned either anticlockwise or clockwise.

Exemplary Embodiment 4

Figure 5:
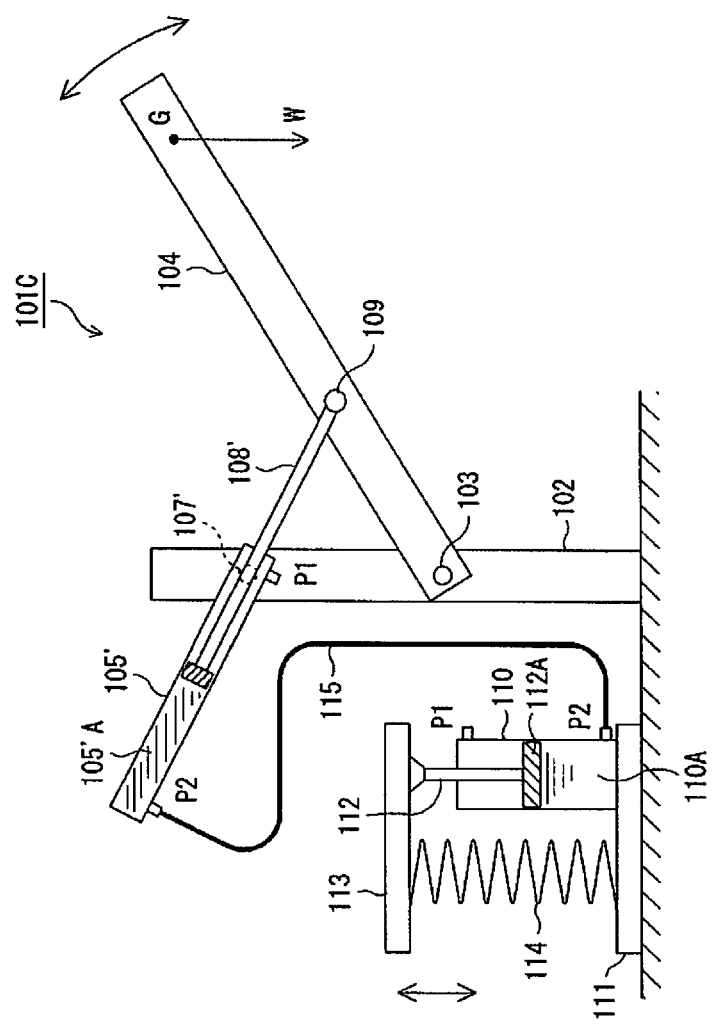
FIG. 5 is a schematic diagram of Exemplary Embodiment 4 of the load compensation device according to the present invention.

The load compensation device 101C shown in FIG. 5 has the same configuration as the load compensation device shown in FIG. 3 described above, except that the head side of a cylinder chamber 105'A of the actuating cylinder 105' and the head side of the cylinder chamber 110A of the compensation cylinder 110 are filled with working fluid, the port P2 on the head side of the actuator cylinder 105' and the port P2 on the head side of the compensation cylinder 110 are linked by the conduit 115, and the ports P1 on the rod side of each are open to the atmosphere.

In the load compensation device 101C according to this exemplary embodiment, negative pressure produced on the head side of the cylinder chamber 105'A of the actuator cylinder 105' by the tensile load acting on the piston rod 108' of the actuating cylinder 105' is transmitted to the head side of the cylinder chamber 110A of the compensation cylinder 110 through the conduit 115, and the piston 112A of the compensation cylinder 110 is suctioned downward, thereby causing the compression coil spring 114 (spring member) to contract; the coordinated operations of the piston of the actuator cylinder 105' and the piston of the compensation cylinder 110 are the same as in the load compensation devices 101, 101A described previously.

Moreover, in the load compensation device 101C according to this exemplary embodiment, one of the ports P1 of the actuator cylinder 105' and the compensation cylinder 110 is linked to the driving fluid circuit, and the other port P1 is open to the atmosphere, or both ports P1 are linked to the driving fluid circuit, and as a result the working arm 104 can be driven in the same way as in the load compensation device 101B shown in FIG. 4 described above.

Exemplary Embodiment 5

Figure 6:
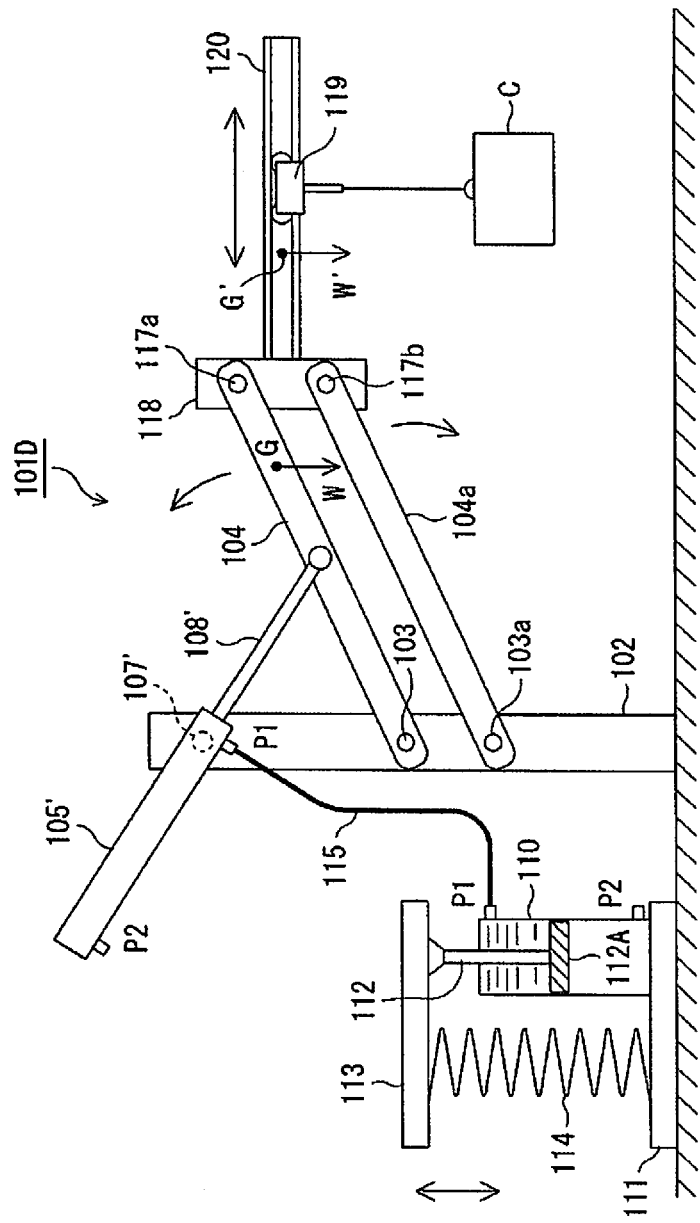
FIG. 6 is a schematic diagram of Exemplary Embodiment 5 of the load compensation device according to the present invention.

FIG. 6 is a schematic view in side section showing yet another exemplary embodiment of the load compensation device according to the present invention; this load compensation device 101D has the same basic structure as the load compensation device 101A in FIG. 3 described above, but it also comprises an auxiliary working arm 104a which is pivotably supported on the supporting body 102 by a shaft 103a below the working arm 104.

The tip ends of the working arm 104 and the auxiliary working arm 104a are pivotably linked to a linking support body 118 by a shaft 117a (fourth pivot-mounting part) and a shaft 117b, respectively, and a parallel link is formed by the supporting body 102, working arm 104, linking support body 118, and auxiliary working arm 104a.

This means that the linking support body 118 is always held at a fixed attitude, regardless of the angle of inclination of the working arm 104.

A trolley guide rail 120 for movably guiding a trolley 119 from which is suspended a load C is horizontally attached in a cantilever state to the linking support body 118. In this load compensation device 101D, when a load W' which is equivalent to the total weight of the trolley guide rail 120, trolley 119, and load C acts on the linking support body 118 at a point of application G', load torque acts on the linking support body 118 about the shaft 117a (fourth pivot-mounting part) due to the load W', but this load torque is not applied to the working arm 104 or auxiliary working arm 104a because of the parallel motion mechanism formed by the parallel link mechanism comprising the supporting body 102, working arm 104, linking support body 118 and auxiliary working arm 104a.

If the spring constant of the compression coil spring 114 is therefore selected for a system in which the combined weight of the working arm 104, auxiliary working arm 104a, and linking support body 118 plus the load W which is combined with the load W' act on the working arm 104 at the point of application G, the working arm 104 can be balanced at any angle, regardless of the position of the trolley 119 on the trolley guide rail 120.

It should be noted that the parallel motion mechanism for always holding the linking support body 118 at a fixed attitude regardless of the angle of inclination of the working arm 104 is not limited to the parallel link mechanism described above, and it is equally feasible to form a parallel motion mechanism in which a pair of hydraulic cylinder devices which are linked together by pipes and have both piston rods synchronized are incorporated between the supporting body 102 and working arm 104, and between the working arm 104 and the linking support body 118, in such a way that the linking support body 118 is held at a fixed attitude regardless of the angle of the working arm 104, for example, although this is not depicted.

Furthermore, the parallel motion mechanism may equally be formed by fixing toothed pulleys having the same number of teeth at the position of the shaft 103 of the supporting body 102 and at the position of the shaft 117a of the linking support body 118, and running a timing belt between the toothed pulleys; or the parallel motion mechanism may be formed by linking the area between the supporting body 102 and the linking support body 118 with a wire which is parallel to the working arm 104, for example, although these are not depicted.

Furthermore, in the load compensation device 101D, the trolley guide rail 120 is attached to the linking support body 118, but this is not limiting, and a second-stage working arm may be pivotably supported by the linking support body 118, and an actuator cylinder may also be included between the linking support body 118 and the second-stage working arm so that loads acting on the second-stage working arm can also be compensated under the same principle as with the load compensation devices described above, for example.

In addition, in the abovementioned load compensation devices 110, 101A, 101B, 101C, and 101D, multiple working arms may be arranged in parallel in such a way that the first pivot-mounting parts are placed on the same horizontal straight line, and the actuator cylinder of each working arm is linked to a common compensation cylinder, thereby allowing the working arms to cooperate.

In this case, if an article whereof the height of the bottom surface is non-uniform is held on the working arms, the vertical positions of the working arms can be automatically adjusted to fit the bottom surface shape of the article and the weight of the article can be uniformly loaded on the working arms, and the working arms can be moved up and down together, while the load on each working arm is compensated. However, in the case of the load compensation device 101D, a holding arm should be attached to the linking support body 118, instead of the trolley guide rail 120, and the article should be held thereon.

Exemplary Embodiment 6

Figure 7:
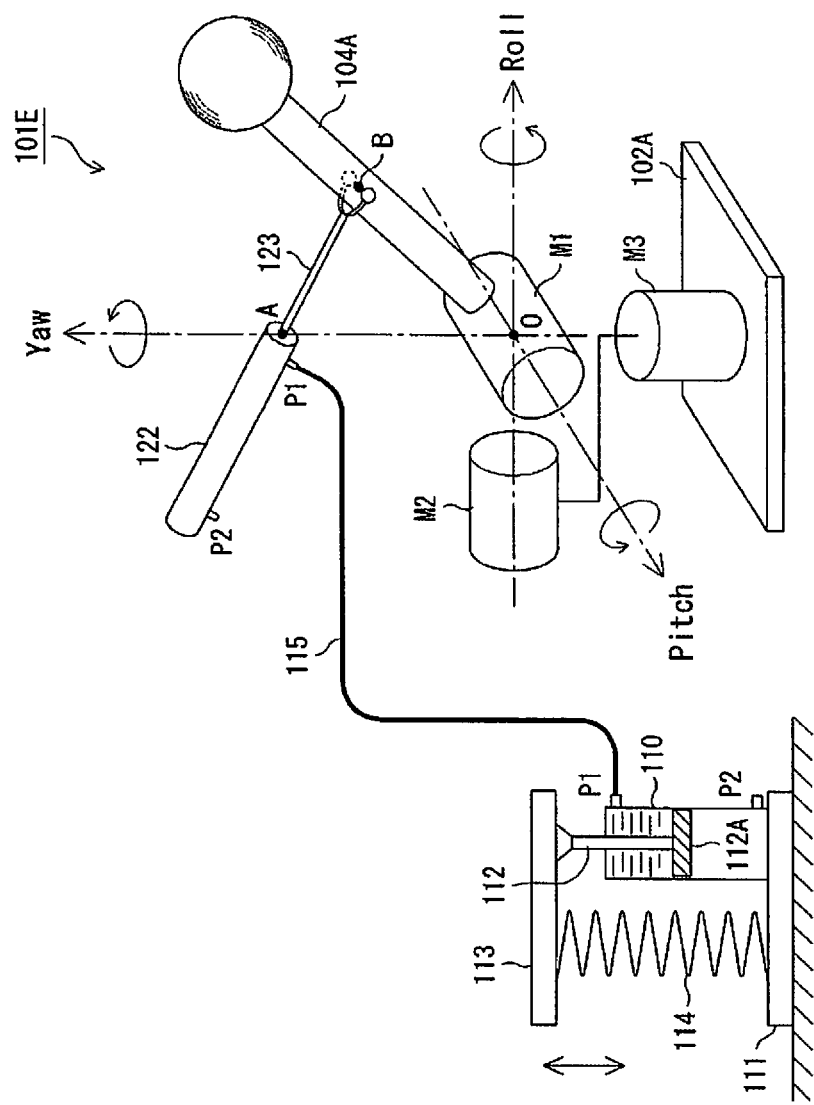
FIG. 7 is a schematic diagram of Exemplary Embodiment 6 of the load compensation device according to the present invention.
Figure 8:
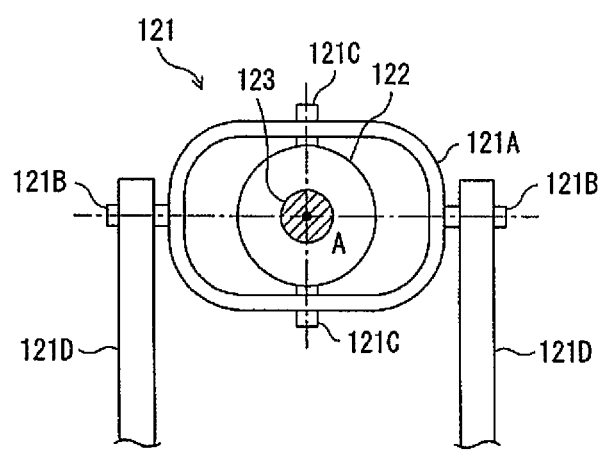
FIG. 8 is a partial diagram of the support structure of the actuator cylinder in Exemplary Embodiment 6.

FIG. 7 is a schematic oblique view showing a further different exemplary embodiment of the load compensation device according to the present invention; in the load compensation device 101E shown in this figure, the working arm 104A is supported on a supporting body 102A in such a way as to be able to pivot about various axes, namely a Pitch axis, Roll axis, and Yaw axis orthogonal to one another at the point O of the first pivot-mounting part.

It should be noted that in FIG. 7, M1, M2, M3 schematically represent an actuator for swinging the working arm 104A about the Pitch axis, an actuator for inclining said working arm about the Roll axis, and an actuator for turning said working arm about the Yaw axis, respectively.

Furthermore, as shown in FIG. 7, the end of an actuating cylinder 122 on the rod side is supported at the fixed position of the point A which is vertically above the point O, by way of a gimbal frame 121A of a gimbal mechanism 121 formed by the second pivot-mounting part, on a gimbal support frame 121D in such a way as to be able to pivot about double shafts 121B, 121C whereof the axial lines of extension are orthogonal to each other at the point A, although this is not depicted. The gimbal support frame 121D is provided above the supporting body 102A with a positional relationship which is fixed relative thereto.

Furthermore, the tip end of a piston rod 123 of the actuator cylinder 122 is pivotably linked at a third pivot-mounting part provided at a point B part way along the working arm 104A in the lengthwise direction thereof. The third pivot-mounting part is formed using a ball joint or the like which can follow the pivoting of each of the axes of the working arm 104A, namely the Pitch axis, Roll axis, and Yaw axis, although this is not depicted.

The actuator cylinder 122 has substantially the same structure as the load compensation device 101A shown in FIG. 3 described above, and it is only the linking structure of the second pivot-mounting part which is different. Furthermore, elements represented by the same numbers as in FIG. 3 have the same structure as in the load compensation device 101A.

In FIG. 7, the three points consisting of the point O at the center of the first pivot-mounting part, the point A at the center of the second pivot-mounting part, and the point B at the center of the third pivot-mounting part are always positioned in a vertical plane, and the arrangement of these pivot-mounting parts within this vertical plane has the same geometric relationship as the arrangement of the shaft 103, shaft 107', and shaft 109 of the load compensation device 101A shown in FIG. 3.

The load on the working arm 104A can therefore be compensated under the same principle as with the load compensation device 101A, whatever the direction of pivoting about the point O at the center of the first pivot-mounting part, and the load on the actuators M1, M2, M3 can be reduced.

The load compensation devices 101, 101A, 101B, 101C, 101D, and 101E in the abovementioned exemplary embodiments of the present invention all have a structure in which an actuator cylinder is pivotably supported by the second pivot-mounting part at a fixed position which is separated from and vertically above the first pivot-mounting part which is the pivoting center of the working arm with respect to the supporting body, and the piston rod which has the piston inserted into the actuator cylinder is pivotably linked by the third pivot-mounting point at a position part way along the working arm in the lengthwise direction thereof, but the actuator cylinder and the piston rod thereof may have the opposite orientation and a layout is possible in which the piston rod side is linked to the second pivot-mounting part and the actuator cylinder side is linked to the third pivot-mounting part, and if necessary, either of these systems may be selected, so there is a large amount of design freedom.

Figure 9:
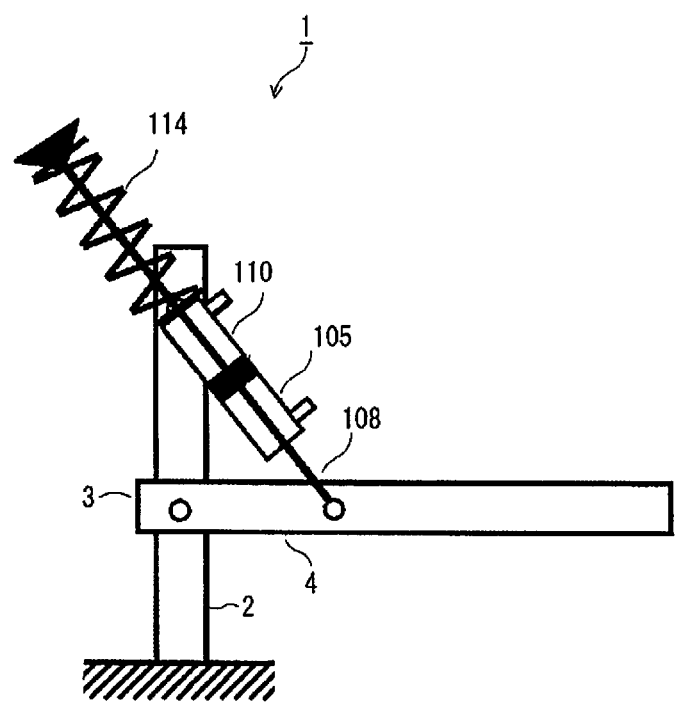
FIG. 9 is a schematic diagram of a load compensation device in which the actuator cylinder and the compensation cylinder are formed as a single piece.

In the load compensation devices 101, 101A, 101B, 101C, 101D, and 101E according to Exemplary Embodiments 1 to 6, if the pressure-receiving surface area S1 of the pistons of the actuator cylinders 105, 105', and 122 and the pressure-receiving surface area S2 of the piston of the compensation cylinder 110 are equal at S1=S2 and the two cylinders are linked without the conduit 115, then the actuator cylinder and the compensation cylinder can be provided as a single piece, as shown in FIG. 9, and this is equivalent to a structure in which the two cylinders are connected by only one piston. In addition, a load can be compensated by means of a spring alone if the compression coil spring 114 is disposed in series with the abovementioned single-piece cylinder, as in the exemplary embodiments below.

Exemplary Embodiment 7

Figure 10:
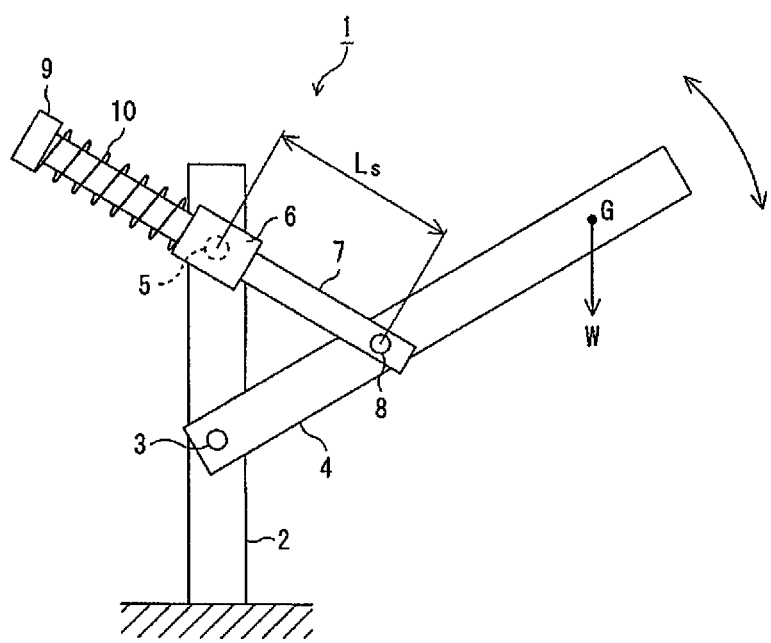
FIG. 10 is a schematic diagram of Exemplary Embodiment 7 of the load compensation device according to the present invention.

FIG. 10 is a schematic diagram showing Exemplary Embodiment 7 of the load compensation device according to the present invention; the load compensation device 1 shown in this figure comprises a supporting body 2 which is secured to a floor surface. A working arm 4 is supported on the supporting body 2 by means of a horizontal shaft 3 (first pivot-mounting part) in such a way as to be able to pivot about said shaft 3.

Furthermore, at a position vertically above the shaft 3 of the supporting body 2, a block-shaped slider 6 is pivotably supported about a shaft 5 (second pivot-mounting part) parallel to the shaft 3. A guide hole which is not depicted is formed in the slider 6, and a guide rod 7 is slidably guided and supported in the lengthwise direction thereof in the guide hole.

It should be noted that the line of extension of the shaft 5 and the axis of the guide rod 7 have an orthogonal positional relationship, and the shaft 5 is linked to the slider 6 by means of a structure which does not project into the guide hole.

One end of the guide rod 7 is linked at a position part way along the working arm 4 in the lengthwise direction thereof by a shaft 8 (third pivot-mounting part) which is parallel to the shaft 3, in such a way as to be able to pivot about the shaft 8. Furthermore, a spring-receiving part 9 is provided at the other end of the guide rod 7.

In this exemplary embodiment, the spring-receiving part 9 is formed as a single piece with the guide rod 7 and with a larger diameter than said guide rod, and a compression coil spring 10 is extendibly placed over the guide rod 7 between the spring-receiving part 9 and the slider 6, in a state in which the spring is pre-compressed from its natural length to a length equal to the distance $L_s$ between the shafts 5 and 8.

Moreover, if the spring-receiving part 9 consists of a separate component in the form of a nut which screws onto a thread formed to a predetermined length at the other end of the guide rod 7, the compression coil spring 10 can be easily assembled with the guide rod 7 and the compressed length can be easily adjusted.

In FIG. 10, a load W equivalent to the combined total weight of the working arm 4 itself and an external load acting vertically thereon (for example, when the working arm 4 is a robot arm, this means the weight of an end effector or workpiece etc. acting on the tip end of the arm, and when it is a crane arm, this means the weight of the suspended load) acts vertically on the working arm at the position of the point of application G.

Figure 11:
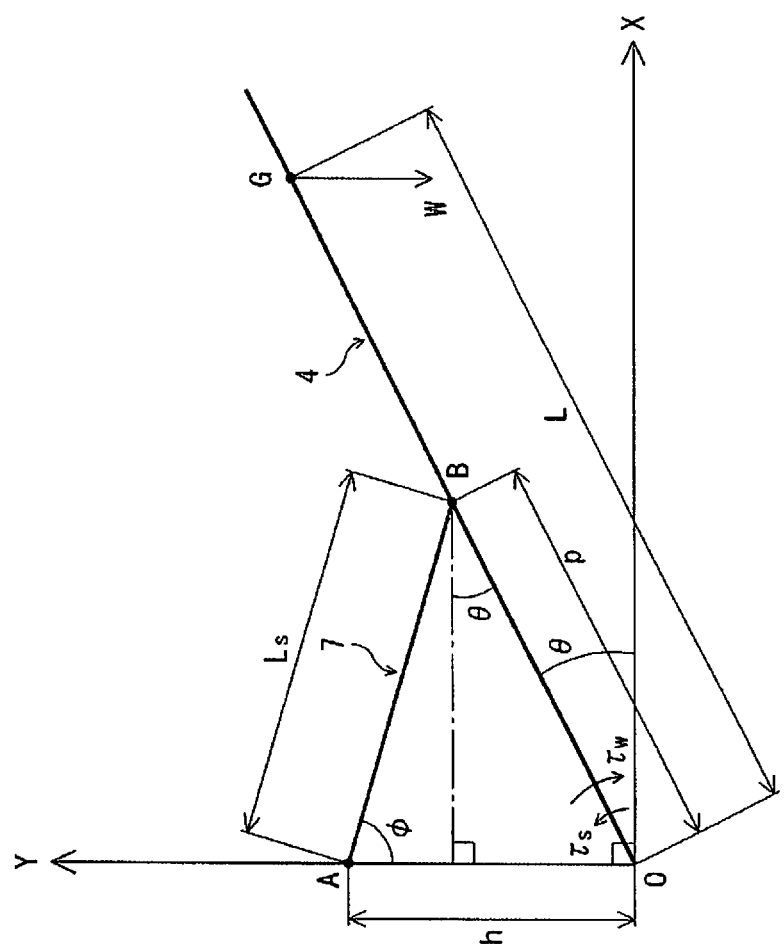
FIG. 11 is a schematic diagram showing the geometric relationship of the various elements of the load compensation device in Exemplary Embodiment 7.

FIG. 11 illustrates the geometric relationship of the various elements in the load compensation device 1 described above; in this figure, the point O is in the center position of the shaft 3, and the angle θ represents the angle of inclination with respect to the horizontal direction X of the working arm 4.

Furthermore, the point A is the center position of the shaft 5 and lies a distance h away from the point O in the vertical direction Y. Furthermore, the point B is the center position of the shaft 8, and the distance between the points A and B is the abovementioned distance $L_s$.

If the distance between the point O and the point of application G where the load W acts is L, then the load torque $\tau_W$ on the working arm 4 about the point O which is produced by the load W is as follows:

$$\tau_W = WL \cos\theta \quad (6)$$

Meanwhile, the abovementioned compression coil spring 10 is compressed by a distance which is equal to the distance $L_s$ between the points A and B, so if the spring constant thereof is k, the restoring force $kL_s$ of the compression coil spring 10 acts on the guide rod 7 as tensile force.

As a result, the following spring force torque $\tau_s$ is produced in the working arm 4 about the point O by the restoring force $kL_s$:

$$\tau_s = kL_s h \sin\phi \quad (7)$$

Furthermore, as can be seen in FIG. 10, the following relationship is established between φ and θ:

$$L_s \sin\phi = p \cos\theta \quad (8)$$

so if φ is eliminated from the above equations (2) and (3), $$\tau_s = kph \cos\theta \quad (9)$$

Here, the spring force torque $\tau_s$ has the opposite orientation to the load torque $\tau_W$ and if the spring constant k is selected in such a way that k=WL/ph from the relationship of equations (6) and (9), load compensation can be achieved such that the torque acting about the point O which acts on the working arm 4 is zero, regardless of the angle θ of the working arm 4.

Exemplary Embodiment 8

Figure 12:
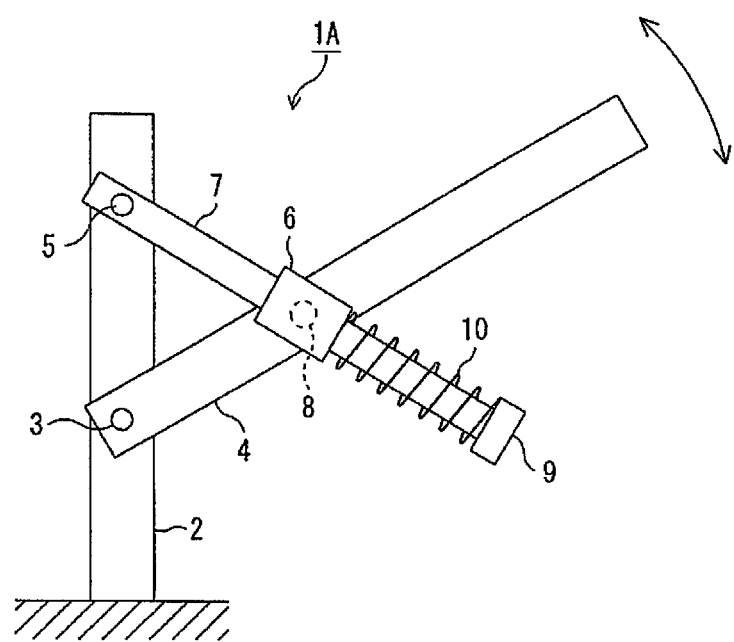
FIG. 12 is a schematic diagram of Exemplary Embodiment 8 of the load compensation device according to the present invention.

FIG. 12 is a schematic diagram showing Exemplary Embodiment 8 of the load compensation device according to the present invention; the load compensation device 1A shown in this figure differs from the load compensation device 1 of Exemplary Embodiment 7 shown in FIG. 9 which was described above in that the orientation at which the guide rod 7 is attached is reversed, and the compression coil spring 10 is disposed toward the bottom of the working arm 4.

That is to say, in the load compensation device 1A, the slider 6 is linked, by means of the shaft 8 (third pivot-mounting part), at a position part way along the working arm 4 in the lengthwise direction thereof in such a way as to be able to pivot about the shaft 8, and one end of the guide rod 7 (the end on the opposite side to the side where the spring-receiving part 9 is provided) is pivotably supported on the supporting body 2 by the shaft 5 (second pivot-mounting part).

It should be noted that elements in FIG. 11 represented by the same numbers as in FIG. 9 have substantially the same configuration as the elements used in the load compensation device 1 described above.

The load compensation device 1A shown in FIG. 12 operates under the same load compensation principle as the load compensation device 1 described above, but the compression coil spring 10 and the guide rod 7 do not project upward and to the rear of the working arm 4, so this is useful when the area to the rear of the working arm 4 cannot be used or when other uses are envisaged.

Exemplary Embodiment 9

Figure 13:
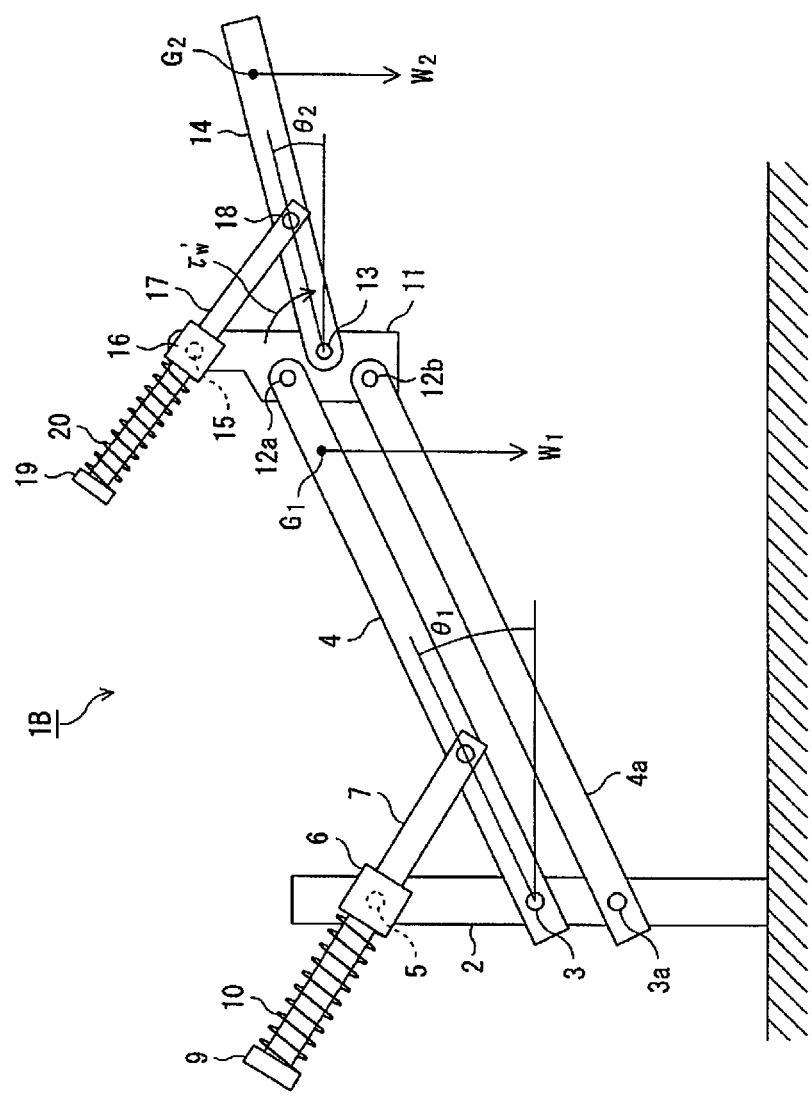
FIG. 13 is a schematic diagram of Exemplary Embodiment 9 of the load compensation device according to the present invention.

FIG. 13 is a schematic diagram showing Exemplary Embodiment 9 of the load compensation device according to the present invention; in the load compensation device 1B shown in this figure, an auxiliary working arm 4a is provided on the supporting body 2 below the working arm 4 of the abovementioned load compensation device 1 shown in FIG. 9 and parallel thereto, in such a way as to be able to pivot about a shaft 3a, and the tip ends of the working arm 4 and the auxiliary working arm 4a are linked by a linking support body 11.

The upper end of the linking support body 11 is pivotably linked to the free end of the working arm 4 by a shaft 12a (fourth pivot-mounting part), and the lower end thereof is pivotably linked to the free end of the auxiliary working arm 4a by a shaft 12b, and a parallel link is formed by the supporting body 2, working arm 4, linking support body 11, and auxiliary working arm 4a.

The linking support body 11 therefore moves in parallel within a vertical plane together with the movement of the working arm 4 while always maintaining an upright attitude. It should be noted that elements in FIG. 12 represented by the same numbers as in FIG. 9 have substantially the same configuration as the elements used in the load compensation device 1 described above.

In the load compensation device 1B according to this exemplary embodiment, a second working arm 14 is linked to the linking support body 11 by means of a horizontal shaft 13 in such a way as to be able to pivot within a vertical plane. The linking support body 11 projects upward of the working arm 4 and a slider 16 is pivotably linked thereto by means of a shaft 15 in the portion which projects vertically above the shaft 13, and a guide rod 17 is guided and supported by the slider 16 in such a way as to be able to slide in the lengthwise direction thereof.

Furthermore, one end of the guide rod 17 is pivotably linked by a shaft 18 at a position part way along the working arm 14 in the lengthwise direction thereof, and a spring-receiving part 19 is provided at the other end of the guide rod 17.

A compression coil spring 20 is extendibly placed over the guide rod 17 between the spring-receiving part 19 and the slider 16, in a state in which the spring is pre-compressed from its natural length to a length equal to the distance between the shafts 15 and 18.

The elements such as the linking support body 11, second working arm 14, slider 16, guide rod 17, and compression coil spring 20 form a load compensation device in which the relationships are the same as in the abovementioned load compensation device 1 in FIG. 9 if the linking support body 11 is counted as a supporting body, and the spring constant of the compression coil spring 20 is determined in the same way as in the case of the abovementioned load compensation device 1 with respect to a load W2 acting in the vertical direction at a point of application G2 on the second working arm 14 (the load W2 is a load equivalent to the sum of the weight of the second working arm 14 itself and an external load acting thereon in the vertical direction), and as a result, the second working arm 14 can be balanced at any angle $\theta_2$.

In the load compensation device 1B according to this exemplary embodiment, the whole of the load W2 on the second working arm 14 side and the load torque $\tau_W{}'$ about the shaft 13 produced by the load W2 act on the linking support body 11, but the load torque $\tau_W{}'$ is not applied to the working arm 4 or the auxiliary working arm 4a because of the abovementioned parallel link mechanism comprising the supporting body 2, working arm 4, linking support body 11, and auxiliary working arm 4a.

If the spring constant of the compression coil spring 10 is therefore selected for a system in which the combined weight of the working arm 4, auxiliary working arm 4a, and linking support body 11 plus the load W1 which is equivalent to the total load in combination with the load W2 acting on the working arm 4 at the point of application G1, the working arm 4 can be balanced at any angle $\theta_1$, regardless of the angle $\theta_2$ of the second working arm 14.

The load compensation device 1B according to this exemplary embodiment employs a parallel motion mechanism comprising a parallel link mechanism in order to ensure that the linking support body 11 is held at a fixed attitude regardless of the angle $\theta_1$ of the working arm 4 and that the load torque $\tau_W{}'$ exerted on the linking support body 11 is not applied to the working arm, but the parallel motion mechanism is not limited to a parallel link employing the auxiliary working arm 4a.

It is equally feasible to form a parallel motion mechanism in which a pair of hydraulic cylinder devices which are linked together by pipes and have piston rods which extend and contract synchronously are incorporated between the supporting body 2 and working arm 4, and between the working arm 4 and the linking support body 11, in such a way that the linking support body 11 is held at a fixed attitude regardless of the angle of the working arm 4, for example, although this is not depicted.

Furthermore, the parallel motion mechanism may equally be formed by fixing toothed pulleys having the same number of teeth at the position of the shaft 3 of the supporting body 2 and at the position of the shaft 12a of the linking support body 11, and running a timing belt between the toothed pulleys; or the parallel motion mechanism may be formed by linking the area between the supporting body 2 and the linking support body 11 with a wire which is parallel to the working arm 4, for example, although these are not depicted.

Furthermore, the load compensation device 1B according to this exemplary embodiment has a two-stage arm structure in which the second working arm 14 is linked to the tip end of the working arm 4 with the linking support body interposed, but three or more stages are feasible, and the load on the working arm of each stage in the case of two or more stages of working arms can also be individually compensated, regardless of the angle, by incorporating a parallel motion mechanism comprising a parallel link mechanism or the like such as that described above.

In the load compensation device 1B described above, the guide rods 7, 17 and the compression coil springs 10, 20 are disposed above the working arm 4 and the second working arm 14 in the same way as in the load compensation device 1 shown in FIG. 10, but the guide rods 7, 17 and the compression coil springs 10, 20 may instead each be disposed below the working arm 4 or auxiliary working arm 4a and the second working arm 14, in the same way as in the load compensation device 1A shown in FIG. 11.

In addition, instead of the second working arm being linked to the linking support body 11, an end effector or a lifting beam for supporting a suspended load etc. may be attached in front of the working arm 4, such that the center of gravity position moves forward or backward.

Exemplary Embodiment 10

Figure 14:
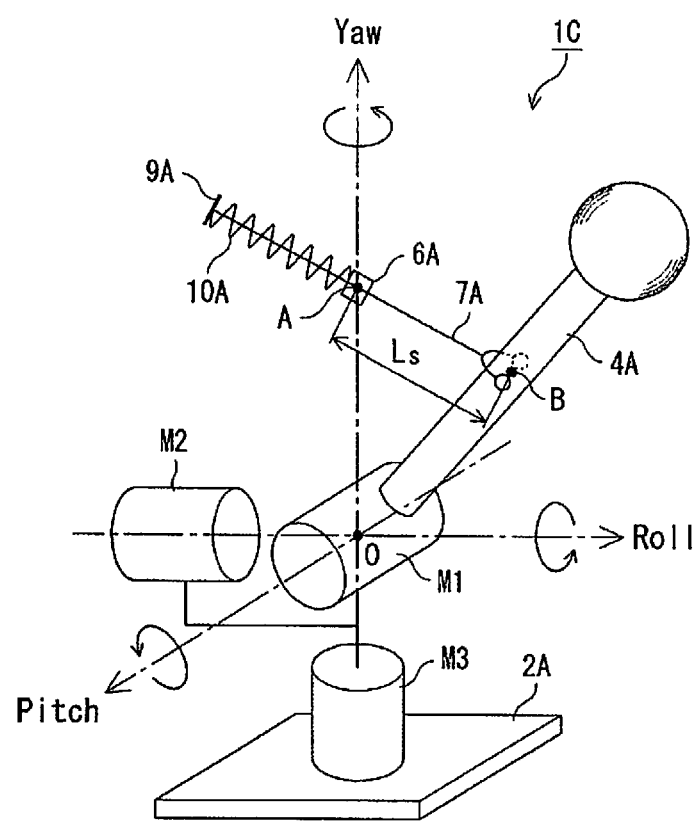
FIG. 14 is a schematic oblique diagram of Exemplary Embodiment 10 of the load compensation device according to the present invention.

FIG. 14 is a schematic oblique view showing Exemplary Embodiment 10 of the load compensation device according to the present invention; in the load compensation device 10 shown in this figure, the working arm 4A is supported on a supporting body 2A in such a way as to be able to pivot about various axes, namely a Pitch axis, Roll axis, and Yaw axis orthogonal to one another at the point O of the first pivot-mounting part.

It should be noted that in FIG. 14, M1, M2, M3 schematically represent an actuator for swinging the working arm 4A about the Pitch axis, an actuator for inclining said working arm about the Roll axis, and an actuator for turning said working arm about the Yaw axis, respectively.

Figure 15:
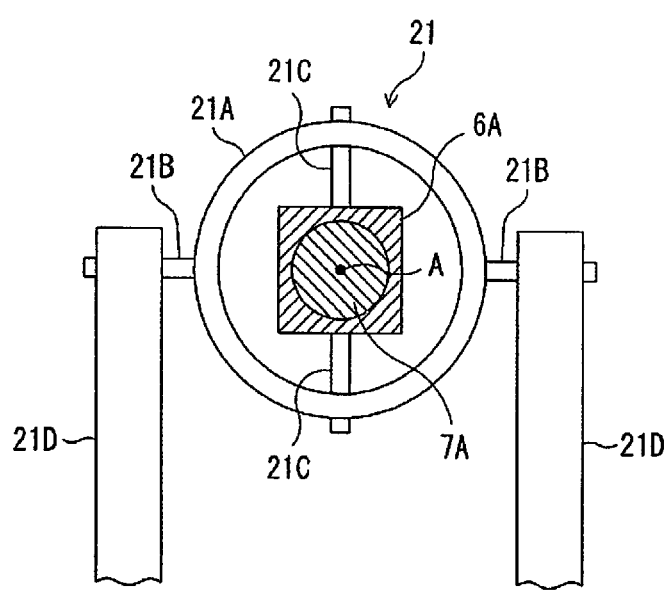
FIG. 15 is a partial view showing the support structure of the slider of the load compensation device in Exemplary Embodiment 10.

Furthermore, as shown in FIG. 15, a slider 6A is supported at the fixed position of the point A which is vertically above the point O, by way of a gimbal frame 21A of a gimbal mechanism 21 formed by the second pivot-mounting part, on a gimbal support frame 21D in such a way as to be able to pivot about double shafts 21B, 21C whereof the axial lines of extension are orthogonal to each other at the point A, although this is not depicted in FIG. 14. The gimbal support frame 21D is provided above the supporting body 2A with a positional relationship which is fixed relative thereto.

A guide rod 7A slidably runs through the center of the slider 6A, and one end of said guide rod is pivotably linked by the third pivot-mounting part to the point B in a position part way along the working arm 4A in the lengthwise direction thereof, as shown in FIG. 13. The third pivot-mounting part is formed using a ball joint or the like which can follow the pivoting of each of the axes of the working arm 4A, namely the Pitch axis, Roll axis, and Yaw axis, although this is not depicted.

A spring-receiving part 9A is provided at the other end of the guide rod 7A. A compression coil spring 10A is extendibly placed over the guide rod 7A between the spring-receiving part 9A and the slider 6A, in a state in which the compression coil spring 10A is pre-compressed from its natural length to a length equal to the distance $L_s$ between the point A at the center position of the second pivot-mounting part and the point B at the center position of the third pivot-mounting part.

The three points consisting of the point O at the center of the first pivot-mounting part, the point A at the center of the second pivot-mounting part, and the point B at the center of the third pivot-mounting part are always positioned in a vertical plane, and the arrangement of these pivot-mounting parts within this vertical plane has the same geometric relationship as the arrangement of the point O at the center of the shaft 3 (first pivot-mounting part), the point A at the center of the shaft 5 (second pivot-mounting part), and the point B at the center of the shaft 8 (third pivot-mounting part) in the load compensation device 1 described in relation to FIGS. 9 and 10.

This means that a load on the working arm 4A can be compensated under the same principle as with the load compensation device 1 described above, whatever the direction of pivoting about the point O at the center of the first pivot-mounting part, and the load on the actuators M1, M2, M3 can be reduced.

It should be noted that in the load compensation device 1C according to this exemplary embodiment, the compression coil spring 10A is provided upward and to the rear of the working arm 4A, but the orientation at which the guide rod 7A is attached may be reversed, and the compression coil spring 10A may be disposed toward the bottom of the working arm 4A, as in the load compensation device 1A described above.

FIELD OF INDUSTRIAL APPLICATION

The load compensation device according to the present invention can be widely utilized as a load compensation device in various fields, including for robots and manipulators comprising a working arm, and also in simple jib cranes, and furthermore as an arm for desk lamps or tilting wheel holding rails for two-storey parking facilities, or an arm for holding suspended power tools, among other things.

KEY TO SYMBOLS 1, 1A, 1B, 1C load compensation device
2, 2A supporting body
3 shaft (first pivot-mounting part)
3a shaft
4, 4A working arm
4a auxiliary working arm
5 shaft (second pivot-mounting part)
6, 6A slider
7, 7A guide rod
8 shaft (third pivot-mounting part)
9, 9A spring-receiving part
10, 10A compression coil spring
11 linking support body
12a shaft (fourth pivot-mounting part)
12b shaft
13 shaft
14 second working arm
15 shaft
16 slider
17 guide rod
18 shaft
19 spring-receiving part
20 compression coil spring
21 gimbal mechanism (second pivot-mounting part)
21A gimbal frame
21B, 21C shaft
21D gimbal support frame
101, 101A, 101B, 101C, 101D, 101E load compensation device
102, 102A supporting body
103 shaft (first pivot-mounting part)
103a shaft
104, 104A working arm
104a auxiliary working arm
105, 105' actuator cylinder
105A cylinder chamber
106 linking rod
107, 107' shaft (second pivot-mounting part)
108, 108' piston rod
108A piston
109 shaft (third pivot-mounting part)
110 compensation cylinder
110A cylinder chamber
111 fixed frame
112 piston rod
112A piston
113 movable frame
114 compression coil spring (spring member)
115 conduit
116A, 116B driving conduit
117a shaft (fourth pivot-mounting part)
117b shaft
118 linking support body
119 trolley
120 trolley guide rail
121 gimbal mechanism (second pivot-mounting part)
121A gimbal frame
121B, 121C shaft
121D gimbal support frame
122 actuator cylinder
123 piston rod

The invention claimed is:

1. A load compensation device characterized in that it comprises: a supporting body; a working arm whereof one end is pivotably supported on the supporting body by a first pivot-mounting part; an actuator cylinder which is pivotably supported by a second pivot-mounting part at a fixed position on the supporting body vertically above the first pivot-mounting part; a piston rod which has a piston inserted into the actuator cylinder and is pivotably linked by a third pivot-mounting part at a position part way along the working arm in the lengthwise direction thereof; a compensation cylinder which is provided separately from the working arm and is linked to the actuator cylinder by a conduit, and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston; and if a distance between a center position of the first pivot-mounting part and a center position of the second pivot-mounting part is h, a distance between the center position of the first pivot-mounting part and a center position of the third pivot-mounting part is p, a load equivalent to the combined total weight of an object held by the working arm and the working arm itself is W, a distance between a point of application of the load W on the working arm and the center position of the first pivot-mounting part is L, a pressure-receiving surface area of the piston inside the actuator cylinder is $S_1$, and a pressure-receiving surface area of the piston inside the compensation cylinder is $S_2$, then a spring constant of the spring member is $(S_2/S_1)^2(WL/ph)$, and a distance between the center position of the second pivot-mounting part and the center position of the third pivot-mounting part is $L_s$, then the spring member elastically deforms from its natural length by $(S_1/S_2)L_s$.

2. A load compensation device characterized in that it comprises: a supporting body; a working arm whereof one end is pivotably supported on the supporting body by a first pivot-mounting part; an actuator cylinder which is pivotably linked by a third pivot-mounting part at a position part way along the working arm in a lengthwise direction thereof; a piston rod which is pivotably supported by a second pivot-mounting part at a fixed position on the supporting body vertically above the first pivot-mounting part; a compensation cylinder which is provided separately from the working arm and is linked to the actuator cylinder by a conduit and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston; and if a distance between a center position of the first pivot-mounting part and a center position of the second pivot-mounting part is h, a distance between the center position of the first pivot-mounting part and a center position of the third pivot-mounting part is p, a load equivalent to the combined total weight of an object held by the working arm and the working arm itself is W, a distance between a point of application of the load W on the working arm and the center position of the first pivot-mounting part is L, a pressure-receiving surface area of the piston inside the actuator cylinder is $S_1$, and the pressure-receiving surface area of the piston inside the compensation cylinder is $S_2$, then a spring constant of the spring member is $(S_2/S_1)^2(WL/ph)$, and if a distance between the center position of the second pivot-mounting part and the center position of the third pivot-mounting part is $L_s$, then the spring member elastically deforms from its natural length by $(S_1/S_2)L_s$.

3. A load compensation device characterized in that it comprises: a supporting body; a working arm whereof one end is pivotably supported on the supporting body by a first pivot-mounting part; an actuator cylinder which is pivotably supported by a second pivot-mounting part at a fixed position on the supporting body vertically above the first pivot-mounting part; a piston rod which has a piston inserted into the actuator cylinder and is pivotably linked by a third pivot-mounting part at a position part way along the working arm in a lengthwise direction thereof; a compensation cylinder which is provided separately from the working arm and is linked to the actuator cylinder by a conduit and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston; and if a distance between a center position of the first pivot-mounting part and a center position of the second pivot-mounting part is h, a distance between the center position of the first pivot-mounting part and a position of the third pivot-mounting part is p, a load equivalent to the combined total weight of an object held by the working arm and the working arm itself is W, a distance between a point of application of the load W on the working arm and the center position of the first pivot-mounting part is L, a pressure-receiving surface area of the piston inside the actuator cylinder is $S_1$, and a pressure-receiving surface area of the piston inside the compensation cylinder is $S_2$, then a spring constant of the spring member is $(S_2/S_1)^2(WL/ph)$, and if a distance between the center position of the second pivot-mounting part and the center position of the third pivot-mounting part is $L_s$, then the spring member elastically deforms from its natural length by $(S_1/S_2)L_s$; and a port of the actuator cylinder and/or the compensation cylinder on the opposite side to the side where they are linked by the conduit is linked to a driving fluid circuit by way of a driving conduit, and working fluid inside the cylinder chamber which communicates with said port is supplied and discharged from the driving fluid circuit, whereby the working arm is driven.

4. A load compensation device characterized in that it comprises: a supporting body; a working arm whereof one end is pivotably supported on the supporting body by a first pivot-mounting part; an actuator cylinder which is pivotably linked by a third pivot-mounting part at a position part way along the working arm in a lengthwise direction thereof; a piston rod which is pivotably supported by a second pivot-mounting part at a fixed position on the supporting body vertically above the first pivot-mounting part; a compensation cylinder which is provided separately from the working arm and is linked to the actuator cylinder by a conduit and has a piston inserted therein which cooperates with the piston of the actuator cylinder, by way of a working fluid running through the conduit; and a spring member for generating compensation torque to balance the load torque applied to the working arm, by way of the piston rod of the actuator cylinder which cooperates therewith, by urging the piston inside a cylinder chamber of the compensation cylinder either directly or by way of a piston rod of said piston; and if a distance between a center position of the first pivot-mounting part and a center position of the second pivot-mounting part is h, a distance between a center position of the first pivot-mounting part and the center position of the third pivot-mounting part is p, a load equivalent to the combined total weight of an object held by the working arm and the working arm itself is W, a distance between a point of application of the load W on the working arm and the center position of the first pivot-mounting part is L, a pressure-receiving surface area of the piston inside the actuator cylinder is $S_1$, and a pressure-receiving surface area of the piston inside the compensation cylinder is $S_2$, then a spring constant of the spring member is $(S_2/S_1)^2(WL/ph)$, and if a distance between the center position of the second pivot-mounting part and the center position of the third pivot-mounting part is $L_s$, then the spring member elastically deforms from its natural length by $(S_1/S_2)L_s$; and a port of the actuator cylinder and/or the compensation cylinder on the opposite side to the side where they are linked by the conduit is linked to a driving fluid circuit by way of a driving conduit, and working fluid inside the cylinder chamber which communicates with said port is supplied and discharged from the driving fluid circuit, whereby the working arm is driven.

* * * * *